June 6, 1967  W. J. H. CHANG  3,323,341
TUBE MILL AND METHOD
Filed June 28, 1963  7 Sheets-Sheet 6
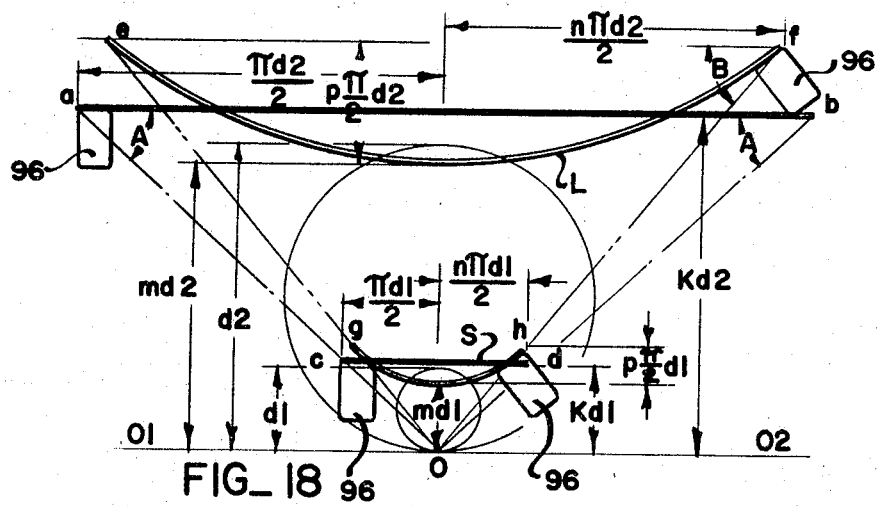
FIG_ 18
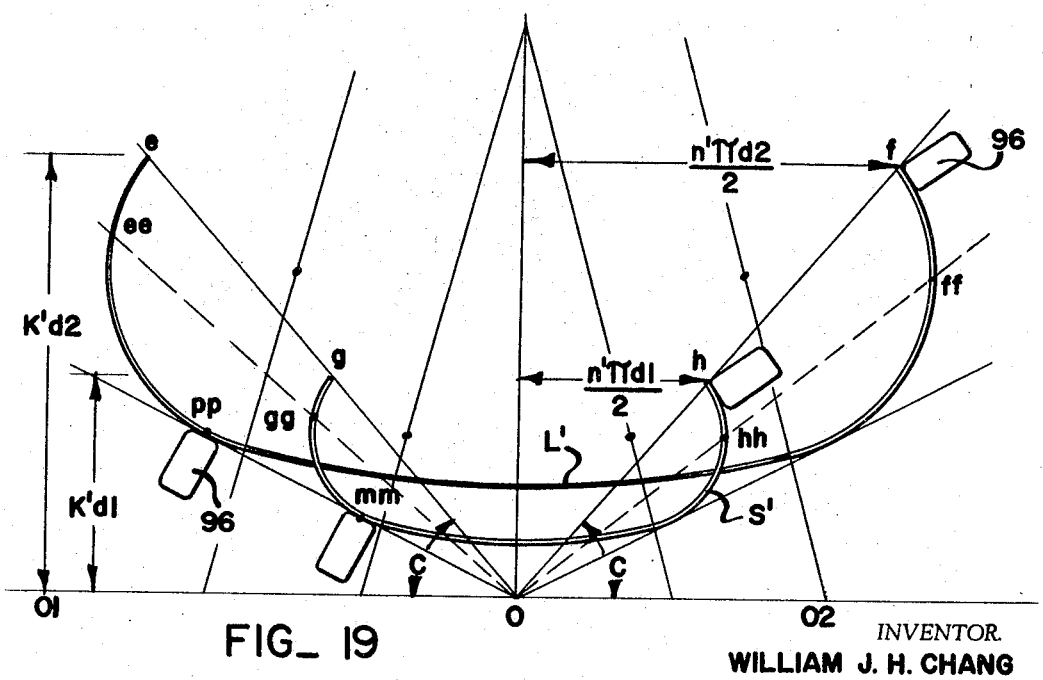
FIG_ 19
INVENTOR.
WILLIAM J. H. CHANG
BY
Oberlin, Maky & Donnelly
ATTORNEYS June 6, 1967 W. J. H. CHANG 3,323,341
TUBE MILL AND METHOD
Filed June 28, 1963 7 Sheets-Sheet 7

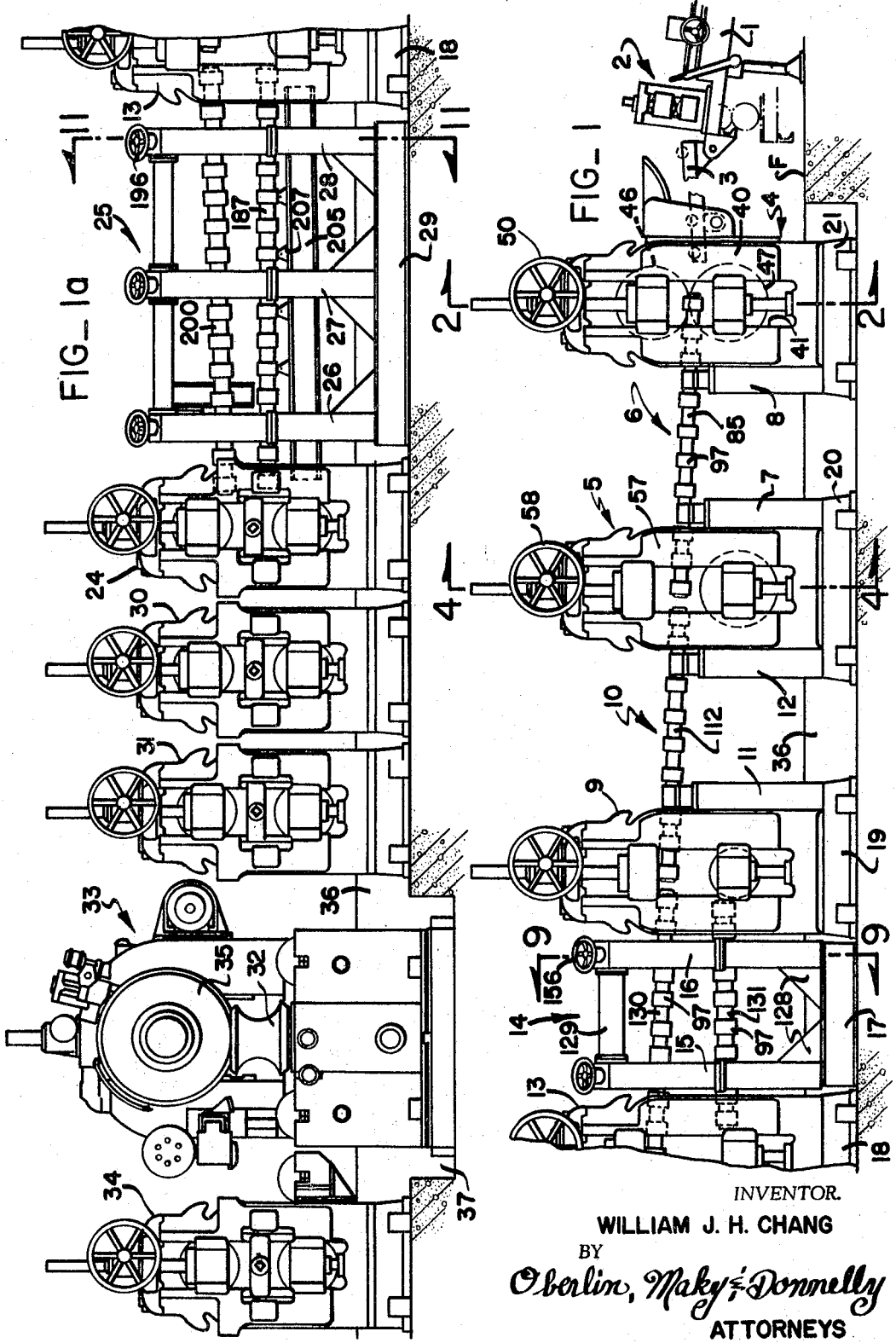

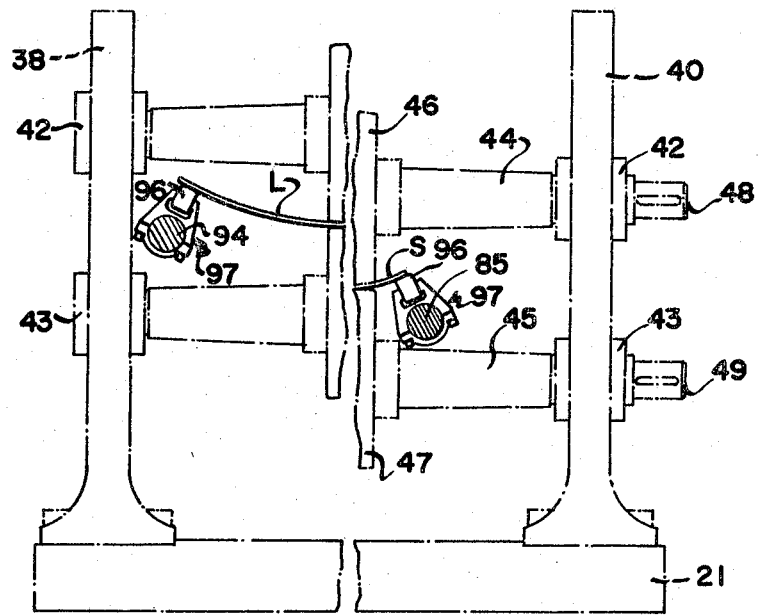
FIG_3  FIG_2
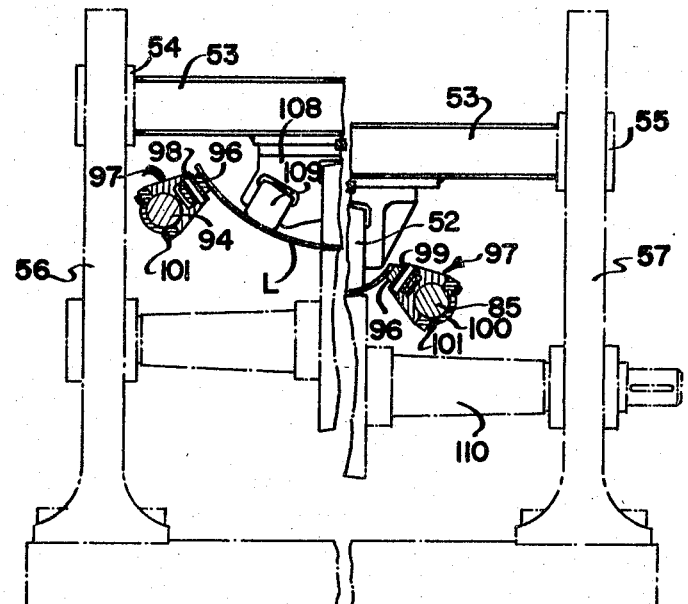
FIG_5  FIG_4
INVENTOR.
WILLIAM J. H. CHANG
BY
Oberlin, Maky & Donnelly
ATTORNEYS June 6, 1967
W. J. H. CHANG
3,323,341
TUBE MILL AND METHOD
Filed June 28, 1963
7 Sheets-Sheet 3
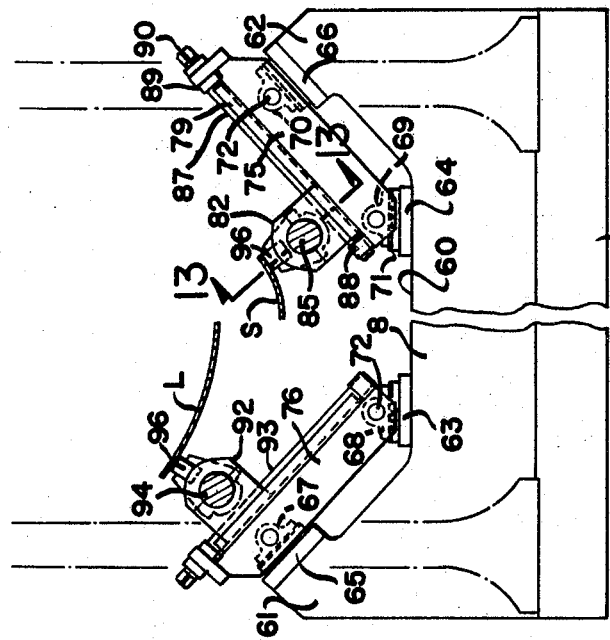
FIG_7  FIG_8
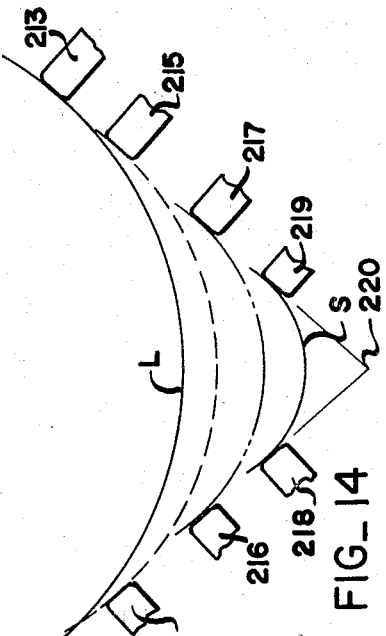
FIG_14
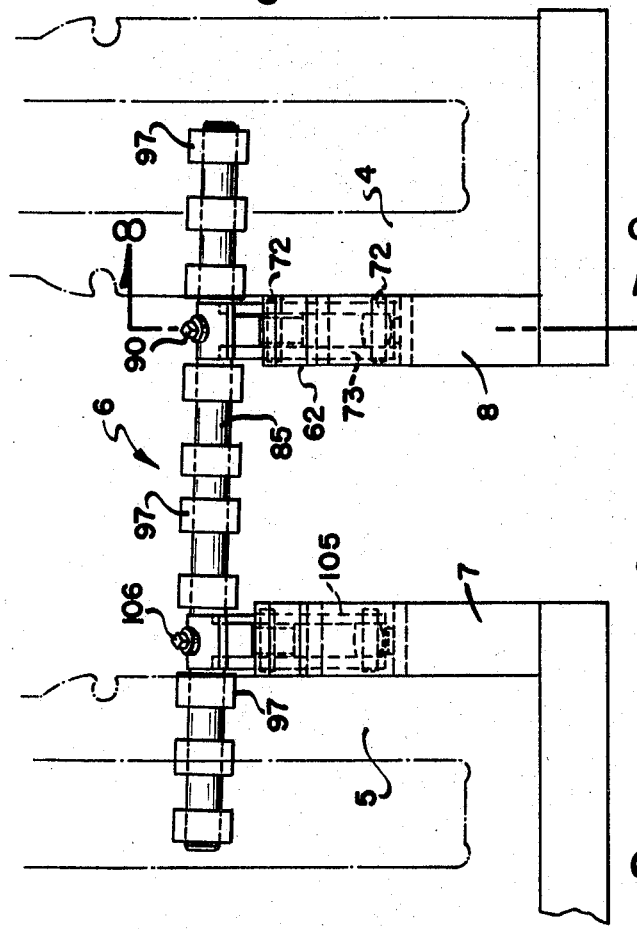
FIG_6
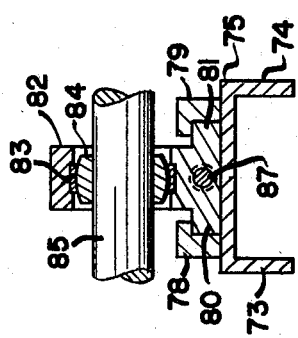
FIG_13
INVENTOR.
WILLIAM J. H. CHANG
BY
Oberlin, Maky & Donnelly
ATTORNEYS

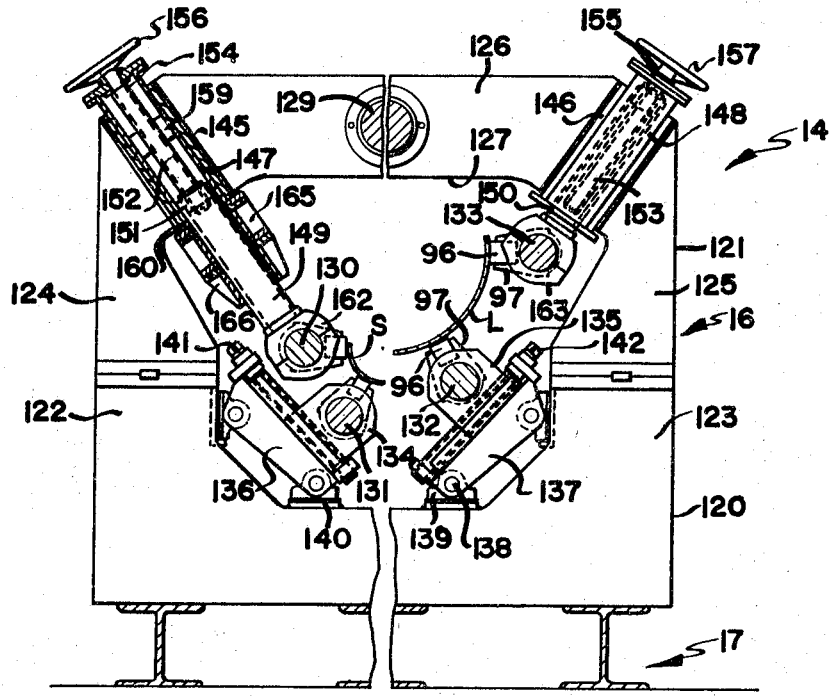
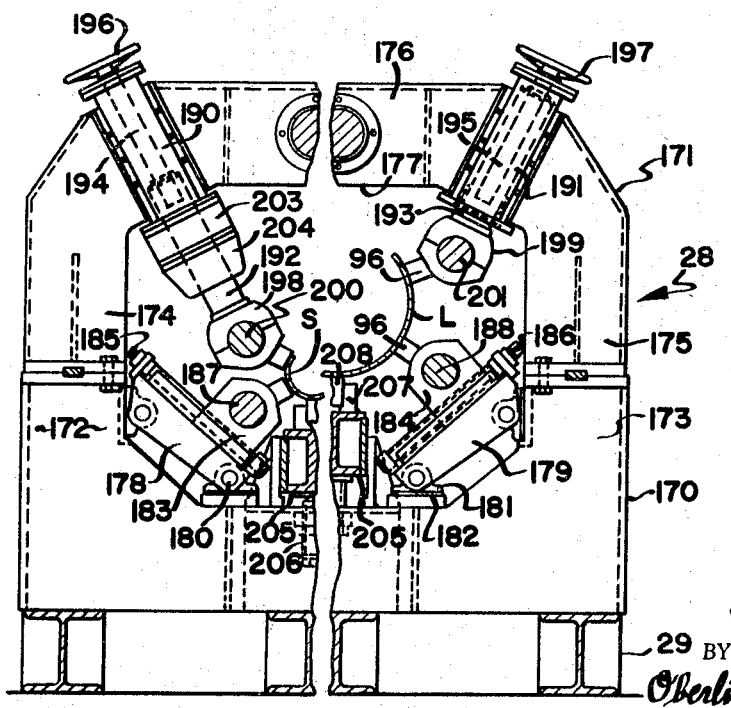

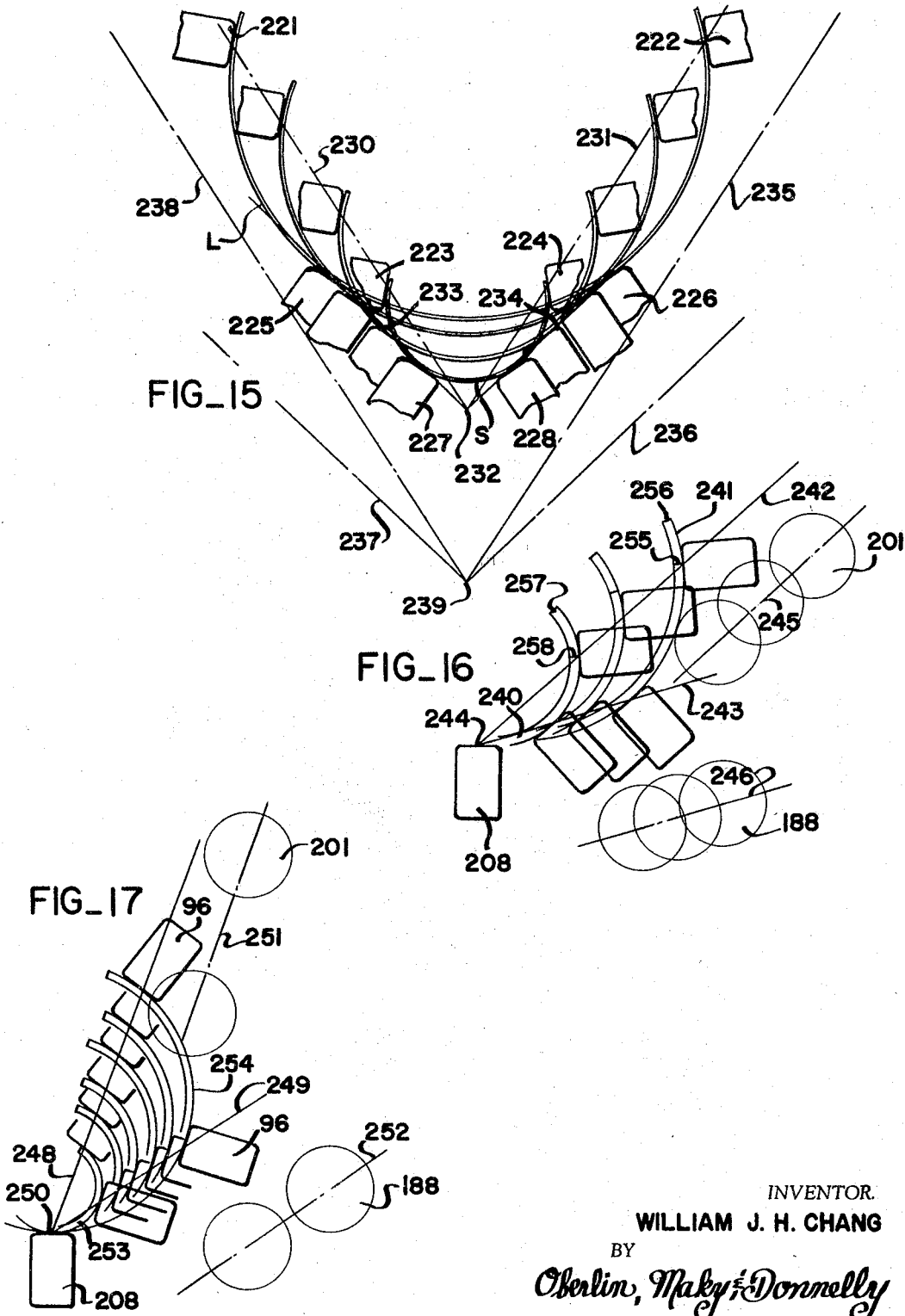

INVENTOR.
WILLIAM J. H. CHANG
BY
Oberlin, Maky & Donnelly
ATTORNEYS

United States Patent Office 3,323,341
Patented June 6, 1967

3,323,341
TUBE MILL AND METHOD
William J. H. Chang, Lakewood, Ohio, assignor to The Yoder Company, Cleveland, Ohio, a corporation of Ohio
Filed June 28, 1963, Ser. No. 291,452
39 Claims. (Cl. 72—178)

This invention relates generally, as indicated, to a tube mill and method and more particularly to a multiple roller assembly system for tube forming mills wherein each roller may be quickly and conveniently adjusted for the formation of tubes of different size.

The use in the tube industry of materials having higher yield strength is leading to the manufacture of tube having lighter and lighter wall thicknesses in relation to the tube diameter. In a continuous forming mill, the shaping of light walled tube calls for a multitude of small rollers generally very closely spaced in place of fewer larger conventional rolls. The multitude of rollers required have led equipment designers to provide complicated contour rolls which require difficult and tedious adjustment and numerous sets of roller assemblies which have to be changed every time tube size is changed. It is accordingly highly desirable to have a multiple roller assembly for tube forming mills which will not require the sets of roller assemblies to be literally replaced every time tube size is changed.

It is accordingly a principal object of the present invention to provide a multiple roller assembly system for tube forming mills using identical rollers in the assembly regardless of location of the roller in the pass or the location of the passes in the assembly.

Another principal object is the provision of a tube mill utilizing the same roller assembly regardless of tube sizes produced.

Another object is the provision of a tube mill wherein the individual adjustment of each roller is avoided.

A further object is the provision of a tube forming mill wherein proper location and inclination of all the rollers in the assembly is achieved by a very simple adjustment for different tube sizes without the aid of pass templates, gauges or measurements.

Still another object is the provision of a tube forming mill wherein the cost of tooling and the time of changeover from one tube size to another is greatly reduced.

Yet another object is the provision of a unique method of roller adjustment in a tube forming mill which will accomplish the above objects.

A yet further object is the provision of a tube mill and method wherein any work contacting roller at any given pass is mounted for movement along an inclined path having constant slope angle to form tubes of varying finished diameter.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIGS. 1 and 1a are broken continuations of each other illustrating a side elevation of an illustrative tube forming mill incorporating the principles of the present invention;

FIG. 2 is a schematic vertical section taken through the No. 1 pass of the mill substantially on the line 2—2 of FIG. 1 illustrating one side of the mill in a position of adjustment for forming one size tube;

FIG. 3 is a fragmentary vertical section similar to FIG. 2 showing the opposite side of the mill, but adjusted to form a finished tube of larger size;

FIG. 4 is a fragmentary vertical section taken through the second pass of the mill on the line 4—4 of FIG. 1 showing the same side as seen in FIG. 2 and showing the roller assembly in the position of adjustment for the smaller size tube;

FIG. 5 is a vertical section also taken on the line 4—4 of FIG. 1 showing the roller assembly in the position of adjustment for the larger size tube;

FIG. 6 is a fragmentary enlarged side elevation of the mill between the first and second pass or between the section lines 2—2 and 4—4 as seen in FIG. 1;

FIG. 7 is a fragmentary vertical section taken substantially on the line 8—8 of FIG. 6 illustrating the roller assembly for one side of the mill in a position of adjustment for the formation of the smaller tubing;

FIG. 8 is a vertical section taken substantially on the line 8—8 of FIG. 6 showing the opposite side of the mill from that shown in FIG. 7 illustrating the roller assembly in a position of adjustment for forming larger size tubing;

FIG. 9 is a fragmentary vertical section of one side of the mill taken substantially on the line 9—9 of FIG. 1 showing one half of a four roller type assembly with the rollers shown in a position of adjustment corresponding to that of FIG. 8 for larger size tube;

FIG. 10 is a fragmentary vertical section of the side of the mill shown in FIG. 7 taken on the line 9—9 of FIG. 1 illustrating the rollers adjusted for smaller size tubing;

FIG. 11 is a fragmentary vertical section taken substantially on the line 11—11 of FIG. 1a showing a five roller type assembly with that half of the mill being illustrated corresponding to FIG. 9 with the rollers in a position of adjustment for large size tubing;

FIG. 12 is a fragmentary vertical section of the opposite side of the mill taken on line 11—11 of FIG. 1a showing the rollers in a position of adjustment for small size tubing;

FIG. 13 is a fragmentary detail sectional view of a roller support shaft mounting taken, for example, on the line 13—13 of FIG. 7;

FIG. 14 is a schematic drawing illustrating the various positions of roller adjustment for different size tubing between passes 1 and 2 of the illustrated mill;

FIG. 15 is a similar schematic section showing the various positions of roller adjustment for different size tubing for the four roller type assembly taken between passes 3 and 4;

FIG. 16 is a similar schematic illustration of the various positions of roller adjustment in the five roller type assembly for various size tubing taken substantially near the No. 5 pass of a slightly different type of mill;

FIG. 17 is a view similar to FIG. 16 taken substantially near the No. 8 pass;

FIG. 18 is a schematic diagram illustrating that the rollers contacting the work at any particular pass may be adjusted along a straight line with constant slope angle for different size finished tubes;

FIG. 19 is a similar schematic diagram illustrating the same to be true with a curved contour having a double radii;

(I) *The mill*

Figure 20:
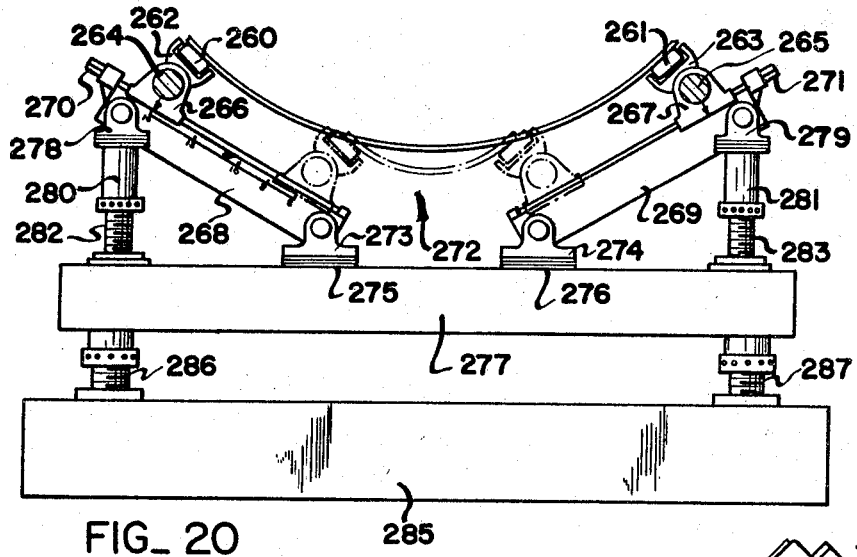
FIG. 20 is a view of a roller stand of the two roller type similar to that shown in FIGS. 7 and 8 but incorporating a refinement in the adjustment of the slide tables.

Referring now to the drawings with more particularity, and especially to FIGS. 1 and 1a, there is illustrated a tube mill incorporating the principles of the present invention. The entry end of the mill is illustrated at the right in FIG. 1 and the exit end of the mill is illustrated at the left in FIG. 1a. An idle conveyor 1 is mounted on an adjustable stand and is inclined upwardly having a feeding pinch roll unit 2 mounted on the end thereof. A bridging conveyor 3 supports the elongated metal strip workpiece from the pinch roll unit 2 to the first stand 4 which forms the pass No. 1 of the tube mill. The metal strip from which the tube is to be formed will be fed from an uncoiler onto the inclined idle conveyor 1, through the pinch roll unit 2 and into the entrance end of the mill at pass No. 1. The illustrated mill is capable of forming pipe from approximately 6⅝ inches in diameter up to 20 inches in diameter and it will be understood that the strip may then vary from approximately 18 inches to in excess of 60 inches in width.

From the stand 4 to the second pass or stand 5, the metal strip or workpiece is supported on a multiple roller assembly shown generally at 6 which includes stands 7 and 8 between and adjacent the roll stands 5 and 4, respectively. From the stand 5 or second pass, the workpiece moves to stand 9 or the third pass and is supported therebetween on a multiple roller assembly 10 which includes stands 11 and 12 adjacent the stands 9 and 5, respectively. From the stand 9 forming pass No. 3, to stand 13 forming pass No. 4, the work is supported on a multiple roller assembly 14 including stands 15 and 16 adjacent the pass stands 13 and 9, respectively. These stands 15 and 16 may be mounted on a separate base 17 interposed between the bases 18 and 19 of the stands 13 and 9, respectively. The stands 11 and 12, however, for the assembly 10, may be mounted on a shelf of the base 19 for the stand 9 and a similar shelf of the base 20 of the stand 5. Similarly, the stands 7 and 8 of the roller assembly 6 between the stands 5 and 4 may be mounted on the bases 20 and 21 of the stands 5 and 4, respectively.

From the stand 13 forming pass No. 4, to stand 24 forming pass No. 5, the work is supported and formed by a multiple roller assembly shown generally at 25 in FIG. 1a. Such assembly includes stands 26, 27 and 28 mounted on base 29 with the stands 26 and 28 being adjacent the pass stands 24 and 13, respectively. The workpiece now moves into stand 30 forming pass No. 6 and stand 31 forming pass No. 7 with the stands 31, 30 and 24 being adjacent to each other. The work which will now be in substantially tubular form moves between a squeeze roll unit 32 on a welder 33 forming the eighth or final pass. The tube formed by the welding unit 33 then moves through a pull out stand 34 to be severed into the desired lengths. The welder 33 may be of the rotary transformer type having large rotary electrodes 35 which contact the work adjacent the longitudinal seam to weld the same.

The main pass stands 4, 5, 9, 13, 24, 30 and 31 as well as the pull-out stand 34 may be mounted in an elongated pit 36 in the floor F of the mill but the welder unit 33 will be mounted in a further pit 37. As seen perhaps more clearly in FIGS. 2 through 4, such main pass stands, which are generally conventional, comprise laterally spaced uprights 38 and 40 having windows 41 therein in which slides 42 and 43 are mounted for vertical movement, such slides having journalled therein the ends of roll shafts 44 and 45 having rolls 46 and 47 centrally thereon, respectively. The projecting ends of such shafts 48 and 49 may be coupled to power shafts, motor driven, thus to rotate the shafts 44 and 45 and the rolls carried thereby. Vertical adjustment of the roll shafts may be obtained by suitable mechanisms such as screws mounted on the slides and turned manually by hand wheels as illustrated at 50 in FIG. 1. However, all of the roll shafts of the main pass stands need not be driven as illustrated in FIGS. 4 and 5 for the stand 5 for pass No. 2. The upper roll unit 52 thereof may be carried on a transverse beam 53 having slides 54 and 55 mounted in the windows of the upright frames 56 and 57 of the stand 5. The transverse frame 53 may be vertically adjusted, however, in the same manner by the wheel 58 as though a driven roll were provided. The main pass stands and the rolls therein which may be mechanically driven may then cause the tube blank or strip workpiece longitudinally to move through the mill to be shaped and formed into the desired tubular sectional shape. The present invention is concerned primarily with the multiple roller assemblies 6, 10, 14 and 25.

(II) *The multiple roller assemblies 6 and 10*
*(two roller type)*

Referring now to the multiple roller assembly 6 between the first and second pass stands 4 and 5, and particularly to FIGS. 2 through 8 and 13, the stands 7 and 8, which are aligned and extend transversely of the mill line, are juxtaposed to the stands 5 and 4, respectively. Each includes a relatively flat top center portion 60 and upwardly projecting laterally outer portions 61 and 62 as seen more particularly in FIGS. 7 and 8 illustrating the stand 8. Base plates 63 and 64 are mounted on the depressed center surface 60 and inclined base plates 65 and 66 are mounted on the upwardly projecting laterally outer portions 61 and 62, respectively. Pillow blocks 67, 68, 69 and 70 are mounted on the base plates 65, 63, 64 and 66, respectively. Such pillow blocks are mounted on the respective base plates by means of shims 71 so that the elevation of such pillow blocks may be fairly accurately controlled. Each pillow block supports a pin or shaft 72 with the pins 72 of the pillow blocks 69 and 70 extending through the legs 73 and 74 of a slide table 75 (see particularly FIG. 13) and the pins 72 of the pillow blocks 67 and 68 extending through the legs of a slide table 76. The slide tables 75 and 76 are thus supported symmetrically on each side of the mill on the stand 8 in a predetermined inclined position by means of the shim supported pillow blocks.

Each slide table, as seen in FIG. 13, may include gibs 78 and 79. Such gibs 78 and 79 overlie and retain the bottom flanges 80 and 81 on a pillow block slide 82 on table 75 which is provided with a liner 83 and a spherical self-aligning bushing 84 supporting therein an elongated shaft 85. An adjusting screw 87 may be threaded into the base of the slide 82 and is journalled at each end of the slide table 75 as indicated at 88 and 89. The upper projecting end of the screw 87 is provided with a squared end 90 so that a suitable screw turning tool may readily be applied thereto. The slide table 76 similarly supports pillow block slide 92 for movement therealong by means of the adjusting screw 93. The slide pillow block 92 in turn supports the shaft 94 by spherical bushings similar to that shown in FIG. 13. It is now believed apparent that the pillow block slides 82 and 92 supporting the shafts 85 and 94, respectively, can be adjusted along the inclined paths provided by the slide tables 75 and 76 by means of the adjusting screws 87 and 93, respectively.

As shown perhaps more clearly in FIGS. 2 through 6, each shaft 85 and 94 of the assembly 6 supports therealong a plurality of work contacting rollers 96 mounted on such shafts by means of special roller support brackets 97. The distal ends of such brackets are bifurcated and support at each end roller pins 98 provided with bearings 99 supporting such rollers 96 for rotation about the axes of such pins. (See FIGS. 4 and 5.) The proximal ends of such brackets may be provided with caps 100 clamping such brackets to the respective shafts by means of clamping or cap screws 101. As seen in FIG. 6, there may be ten such brackets and rollers 96 supported thereby spaced along the shaft 85.

It will be understood that such shafts or rods are supported, in addition to the pillow block slides 82 and 92 on the stand 8, by similar pillow block slides mounted on slide tables 105 on the stand 7. Such pillow blocks may be adjusted along such slides by means of the adjusting screws 106 in a manner identical to that shown for the slides on the stand 8 in FIGS. 7 and 8. The stand 7 may thus be substantially identical in form to the stand 8 with the exception that it is somewhat higher, as illustrated, and the angle of inclination of the slide tables may be somewhat greater. There may be four brackets 97 and rollers 96 supported thereby between the stands 7 and 8 on the shaft 85 and three such brackets and rollers on the projecting ends of such shaft with the end rollers and brackets being supported by the ends of such shafts substantially within the main or power driven pass stands 4 and 5.

As seen in FIGS. 14 through 17, as the work or strip S moves longitudinally through the mill, it will become progressively of circular sectional shape and accordingly each bracket 97 will be slightly angularly offset with respect to the preceding bracket so that the rollers illustrated will desirably be tangent to the exterior periphery of the work. This angular adjustment of the rollers and the brackets may readily be accomplished with the brackets illustrated by means of the clamping screws 101. Whereas the illustrated rollers 96 have a right circular cylindrical surface, it will be understood that rollers having a slightly crowned or concave surface may equally well be employed. However whichever roller profile is chosen should be employed throughout the mill.

Also, it may be desirable that the center distance between the shaft 85 and the roller pin 98 be varied during initial setting up for each individual pass in order to produce ideal transition of metal contour from pass to pass. This can, of course, readily be accomplished by the employment of liners or shims in connection with each bracket or an adjusting screw mechanism may be employed more conveniently to adjust the center distance between the shaft and roller pin. After the initial setting, the brackets may be locked at their set angular positions by means of dowel pins, weldments, or the like. This progressive inclination of the brackets 97 may be seen when viewing FIGS. 2 and 3 and comparing them with FIGS. 4 and 5 showing how the inclination of the brackets has changed from approximately 60° in FIG. 2 to approximately 30° in FIG. 4. This is, of course, dependent upon the contour of the metal S of any particular pass.

It can now be seen that the multiple roller assembly 6 between the first and second main pass stands 4 and 5 is comprised of a plurality of longitudinally spaced work contacting rollers 96 on each side of the work supported on shafts 85 and 94. Each shaft is supported by two adjustable pillow blocks but it will, of course, be understood that further pillow blocks may be employed to support a single shaft. The slide tables, for each pillow block, at a given pass, are equally oppositely inclined and thus symmetrical about the plane of the vertical axis of the mill. The particular slope of paired slide tables is predicated by the location of such tables in the mill. The slide tables support each shaft 85 and 94 extending slightly inclined upwardly in the direction of movement of the work through the mill due to the increasing size of the successive shaft support stands and each slide table has its respective slope of adjustment on its respective stand. The use of the spherical bushings makes it possible to adjust a single roller support shaft by two pillow blocks on slide tables of different slopes. The shafts 85 and 94 are thus enabled to take a wide variety of positions and inclinations.

Now comparatively viewing FIGS. 2, 4 and 7 with FIGS. 3, 5 and 8, respectively, rollers 96, positioned for the smaller tube diameter or the strip S of lesser width at the bottoms of the slide tables 75 and 105, can be adjusted upwardly along such slides for the larger tube diameter or the wide workpiece L by operating the screws 87, 93, etc. Conversely, rollers 96, positioned at the top of the slide tables for the larger tube diameter workpiece L, can be adjusted downwardly for the smaller tube diameter workpiece S by reversely operating the screws independently. To obtain the proper amount of adjustment for each group of rollers for the desired tube size, indicators and scales may be provided on the pillow block 82 and the slide table 75, respectively, for each of the separate shaft supports. However, instead of indicators and markings, each screw may be provided with counters and a proper amount of adjustment can then be obtained by turning the screws the proper number of revolutions. Accordingly, templates, gauges and other time-consuming devices are not necessary for setting up roller positions for varying pipe sizes. The longitudinal inclination of the shafts 85 and 94 may be varied when shifting such shafts along their inclined support paths when moving such shafts to positions accommodating different size tubes.

In FIGS. 2 and 3, shortly after the entry of the work S or L, the rollers 96 on the ends of the shafts 94 and 85 nearest the entry end will underlie the edges of the metal strip bending the same to the shallow curvature illustrated. As the strip moves toward the second main pass stand 5, the edges of the strip will be supported on the rollers 96 to be curved to the more sharply arcuate shape shown in FIGS. 4 and 5. For the larger workpieces L, the top main roll 52 supported on the beam 53 may be replaced by a roll unit 108 which includes lateral rolls 109 maintaining the proper curvature in the larger work. However, it will be understood that the rolls 109 may be made considerably smaller and mounted in a manner similar to the rolls 96 only interior of the workpiece. Basically, the only changes that need to be made to accommodate different size workpieces is vertically to adjust the main rolls of the stands 4 and 5, and to adjust the shafts 85 and 94 along their inclined slide tables. The roll shafts 44, 45 and 110 are, of course, connected to their respective drives by means of flexible drive shafts permitting the vertical adjustment thereof.

The multiple roller assembly 10 extending between the main pass stands 5 and 9 may be substantially identical in form to the multiple roller assembly 6 with the exception that the stands 12 and 11 are progressively higher than the stands 8 and 7 in the direction of travel of the work and the slide tables thereon may have a progressively greater slope angle. For a given size tube, the shafts 112 of the unit 10 may be in substantial alignment with the shafts 85 and 94 of the unit 6. This longitudinal inclination of the shafts of these units may, however, vary with tube sizes. The assemblies 6 and 10 provide a roller system having two rollers per pass along the workpiece and such rollers may support the workpiece just beneath the edges of the metal contour.

(III) *The multiple roller assembly 14 (four roller type)*

However, the multiple roller assembly 14, between the main pass stands 9 and 13, provides an assembly having four rollers per pass. Referring now more particularly to FIGS. 1, 9 and 10, it will be seen that each of the stands 15 and 16 comprises a base portion 120 and a top portion 121 supported on the upstanding side portions 122 and 123 of the base 120. The top portion 121 includes two legs 124 and 125 and a top bridge portion 126 interconnecting such legs and forming an interior window 127 through which the work passes and in which the multiple roller assemblies are adjustable. The stands 15 and 16 are supported on the base 17 which may comprise the three longitudinally extending I-beams shown. Gusset plates 128 may be provided as seen in FIG. 1 rigidifying the stands with respect to the base and a top shaft 129 may extend between the bridge portions 126 of the top portions 121 further rigidifying the entire unit.

Each stand adjustably supports four roller supporting shafts 130, 131, 132 and 133. The shafts 131 and 132 are supported by means of pillow block slides 134 and 135 on inclined slide tables 136 and 137. Such slide tables are in turn supported by means of the shafts 138 on pillow blocks 139 mounted on shims 140 on the base portion 120 in a manner similar to that shown for the multiple roller units 6 and 10. The pillow block slides 134 and 135 may be longitudinally adjusted along such inclined slide tables by means of the adjusting screws 141 and 142. The shafts 131 and 132 will be supported in the pilow blocks by means of spherical self-aligning bushings as illustrated in FIG. 13. Each such shaft will have thereon the work engaging rollers 96 supported on such shaft by means of the brackets 97.

The upper stand portion 121 is provided at its upper corners with reinforcing collars 145 and 146 supporting therein tubular guides 147 and 148 for extensible columns 149 and 150, respectively. The upper end of each column is provided with an internally threaded sleeve or nut 151 in which is threaded adjusting screws 152 and 153. Such screws are journalled in the guide covers as indicated at 154 and 155 and the outer ends of such screws are provided with hand wheels 156 and 157, respectively. Sleeve bushings 159 and 160 may be provided within each tubular guide to facilitate the extension and retraction of the columns by means of the wheel operated screws. The axes of the columns 149 and 150 are oppositely inclined and such columns are then mounted for extension and retraction on axes which are symmetrical about the vertical plane passing longitudinally centrally through the mill.

The distal ends of the columns 149 and 150 are provided with pillow blocks 162 and 163 supporting therein on spherical self-aligning bearings the shafts 130 and 133, respectively. Such shafts carry rollers 96 by means of the brackets 97 in the same manner that the shafts 131 and 132 also carry such rollers. When the columns are extended to form the smaller size tubing work S, rigidifying supports 165 and 166 may be mounted on the guide brackets constituting a rigid continuation of the guide sleeves surrounding such columns and preventing deflection thereof. For an intermediate position of adjustment of the column 149, the outer brace 166 may be removed.

The rollers 96 mounted on the brackets 97 on the shafts 130 and 133 will be at the sides of the metal contour or fairly close to the edge of the metal strips S or L, depending upon the position of adjustment thereof. Such upper shafts may then be mounted by means of the extensible columns to constitute a substantial continuation of the shafts supporting the edge or side metal contour contact rollers in the multiple roller assemblies 6 and 10. The lower shafts 131 and 132 will engage the bottom of the metal contour on each side of the blank, but in any event, it will be seen that the respective shafts 130, 131, 132 and 133 need only be adjusted along their inclined support paths to change the mill to accommodate different size tube.

The rollers 96 on each of the four shafts in the multiple rollers assembly 14, which are supported for movement in each of the stands 15 and 16, will be pre-adjusted on such shafts with the brackets at the proper inclination and the center distance between the various roller pins and the shafts will be properly determined in the initial setup for each individual pass producing the ideal transition of metal contour from pass to pass. Although the rollers 96 need not be exactly transversely aligned with each other at any given pass, it will be seen that the multiple roller assembly 14 provides a plurality of roller clusters of four idler rollers 96 each between the main pass stands 9 and 13. In any event, the roller support shafts positioned for the larger tube sizes as shown in FIG. 9 can quickly and easily be adjusted downwardly along their inclined paths by operating the independent screw adjusting assemblies to provide a four roller idler cluster for smaller tube sizes as seen in FIG. 10.

(IV) *Multiple roller assembly 25 (five roller type)*

Referring now to FIGS. 1a, 11 and 12, the multiple roller assembly 25 is a system which may provide five rollers per pass. The assembly 25 may include three stands 26, 27 and 28 which are generally similar in form to the stands 15 and 16 for the multiple roller assembly 14. Each of these stands 26 through 28 includes a lower portion 170 and an upper portion 171 with the base or lower portion 170 including upstanding side portions 172 and 173 supporting, respectively, the legs 174 and 175 of the upper portion which are joined at the top by bridge portion 176 forming an interior window 177 through which the metal passes and in which the various roller supports are adjustable. The base 29 for the three stands 26 through 28 may comprise three longitudinally extending I-beams as shown and a top shaft and gussets may further rigidify the assembly.

Supported on the bottom of the window 177 on the base portion 170 are oppositely inclined slide tables 178 and 179 which are mounted at each end on shafts 180 supported by pillow blocks 181 in turn mounted on shims 182 on the base 170. Pillow block slides 183 and 184 are carried by the slide tables 178 and 179 and are adjustable therealong by means of the adjusting screws 185 and 186. Such pillow blocks support, by means of spherical bushings, roller supporting shafts 187 and 188.

Oppositely inclined guide sleeves 190 and 191 are mounted on the upper stand portion 171 and extensible columns 192 and 193 are carried therein. Adjusting screws 194 and 195 may be employed to extend and retract such columns by means of the hand wheels 196 and 197. Pillow blocks 198 and 199 on the distal ends of the columns 192 and 193 support therein shafts 200 and 201 by means of the spherical self-aligning bushings such as shown in FIG. 13. As seen in FIG. 12, column rigidifying members 203 and 204 may be employed to preclude deflection of the columns 192 or 193 when extended. The shafts 200, 187, 188, and 201, thus supported in each stand 26 through 28, will carry thereon the longitudinally spaced brackets 97 supporting the idler rollers 96 for engagement with the tube blank S or L and additionally, a longitudinally vertically adjustable beam 205 is provided supported on the base of each stand 26 through 28 on adjusting screws 206 and carrying thereon longitudinally spaced brackets 207 supporting rollers 208 which may be substantially identical in form to the rollers 96. Again, the brackets 97 mounted on the shafts 200, 187, 188, and 201 may be preset on such shafts to provide the proper inclination of the brackets and the proper center distance between the roller pins and the mounting shafts. A comparison of FIGS. 2 and 12 may be had and especially the inclination of the roller mounting bracket 97 on the shaft 85 and the roller 96 mounted on the shaft 200 which will engage the edge of metal contour for the work S. The axis of the roller 96 then shifts in the direction of travel of the work to maintain a substantially tangent position to the work curvature as the work approaches its circular sectional shape.

It is also noted that the column 193 is slightly more inclined than the column 150 in comparing FIGS. 11 and 9. Indeed, in comparing FIGS. 7, 9 and 11, it is noted that the inclined path of adjustment for the rollers contacting the edge of the metal contour has an increasing slope angle as the work progresses through the mill. Theoretically, such path will move from a horizontal to a vertical position. In any event, the roller support shafts 200, 187, 188, and 201 may be adjusted along inclined paths from the top positions thereof seen in FIG. 11 for larger tube diameters downwardly for smaller tube diameters as seen in FIG. 12 by operating the respective adjusting screw mechanisms. The beam 205 may also be raised and lowered by means of the adjusting screws 206 in each of the support stands 26 through 28 to accommodate different size tube.

Although the angular inclination of the path of adjustment of the rollers may vary from pass to pass, at any given pass, the paths of adjustment of the rollers where they contact the work will intersect at a common reference point which is also the intersection of the path with a common reference line which may be the horizontal projection of the bottom of all finished tube. Thus a linear horizontal line drawn from the bottom of the eighth pass or welding unit 33 longitudinally of the mill will intersect the inclined paths of adjustment of all of the rollers including those on beam 205 at any given pass. This point will hereinafter be more fully developed.

Those rollers which contact the edge of the metal will then be mounted on either side of the blank on an upwardly inclined path from the first main stand 4 to the main stand 13. At approximately such stand, the edge of the metal will reach its highest point and as the metal progresses to a more circular shape, the top edge of the metal will descend as indicated by the longitudinal inclination of the roller supporting shaft 200 in FIG. 1a. At the stand 9, additional shafts will be provided for work contacting rollers supporting the sides of the metal contour and beyond stand 13, the beam 205 will be provided for work contacting rollers supporting the bottom center of the metal contour. Thus initially, two roll clusters are provided in the assemblies 6 and 10, then four roll clusters are provided in the assembly 14 and finally in the assembly 25, a five roll cluster is provided. It will, of course, be understood that the two, four and five roller type roller assemblies as exemplified by the assemblies 6, 14 and 25, are not limited in their employment to any particular section of the mill. However, once the roller assemblies are set up with the proper pin-shaft spacing and the proper angular positioning of the brackets 97, it is now apparent that all that need be done to change the mill over to accommodate different size tubing is to adjust the various roller supporting shafts along their inclined supports a proper distance which may be determined by the indicator and scale arrangement or screw revolution counter previously mentioned.

(V) *Illustrative pass adjustments*

FIG. 14 is a schematic section taken between main passes 1 and 2 which illustrates the variety of positions that may quickly be obtained for each of the work contacting rollers 96 of the assembly 6. For example, the uppermost position of the rollers 96 shown at 212 and 213, corresponding to FIG. 8, may be employed with the workpiece L to form a pipe of 20 inches in diameter. The intermediate positions 214 and 215 may be employed to form pipe of 16 inches in diameter. A still further intermediate position shown at 216 and 217 may be employed to form pipe of 10¾ inches in diameter and finally, the lowermost positions 218 and 219, corresponding to FIG. 7, may be employed to form the stock S into pipe of 6⅝ inches in diameter. In any event, the rollers 96 on each side of the mill are simply adjusted along inclined linear paths with the paths for the rollers on each side of the mill intersecting at 220 which is horizontally aligned with the bottom of all finished pipe sizes at the squeeze rolls 32 at pass No. 8 or the welding unit 33.

FIG. 15 is a schematic typical section taken between the main passes 3 and 4 or through the four roller assembly 14 showing the paths of adjustment of the upper and lower rolls and the various positions achieved by such rolls for various size tubing. FIG. 15 should preferably be viewed in conjunction with FIGS. 9 and 10. It will, however, be understood that the schematic section of FIG. 15 need not be taken precisely on the section line 9—9 on which FIGS. 9 and 10 are taken of FIG. 1. Accordingly, the inclination of the rollers 96 may vary somewhat as between FIGS. 9, 10 and 15. For the larger workpiece L, which may form a finished pipe of 20 inches diameter, the upper rollers 96 on the shafts 130 and 133 will be fully elevated or in the position shown for the shaft 133 and the roller 96 in FIG. 9. These positions may be designated 221 and 222 for the rollers mounted on the shafts 130 and 133, respectively. For the smaller workpiece S or that which may form a pipe of 6⅝ inches finished diameter, the rollers 96 will be extended by the screws 152 and 153 to achieve the position indicated at 223 and 224. This position corresponds roughly to the position of the roller 96 on the shaft 130 seen in FIG. 10. Intermediate positions corresponding to those shown in FIG. 14 may also be achieved for intermediate pipe sizes.

The lower rollers may also be shifted as the pipe size varies with the upper or outermost position indicated at 225 and 226 correponding to the position of the roller 96 mounted on shaft 132 shown in FIG. 9. The lower rollers may be moved downwardly along their inclined paths for the smaller tube workpiece S to the positions indicated at 227 and 228 which will correspond roughly to the position of the roller 96 mounted on shaft 131 in FIG. 10. Again, intermediate positions may be achieved on the inclined slide tables for the intermediate pipe sizes. The inclined paths 230 and 231 for the upper rollers mounted on the columns 149 and 150 intersect at the point 232. The inclined paths of contact of the lower rollers 233 and 234 also intersect at the point 232 which is, of course, longitudinally aligned with the point 220 in FIG. 14 which is also longitudinally aligned with the bottom of the pipe at the squeeze roll 32 at the eighth or final pass. In order to achieve this common intersection of the paths of the four rollers, the shaft 133 is mounted for movement along the inclined path 235, the shaft 132 is mounted for movement along the inclined path 236, the shaft 131 is mounted for movement along the path 237, and the shaft 130 on column 149 is mounted for movement along path 238. All of these paths 235 through 238 intersect at the point 239 vertically spaced beneath the point 232.

FIGS. 16 and 17 illustrate how the present invention may be applied to an existing forming mill where the tooling covers a wide break down range and need not necessarily include a tooling layout which is consistently designed. In most consistently designed mills for light wall pipe, the entry height of the metal workpiece will be a certain distance above the bottom of all finished pipe depending upon the pipe size involved. A suitable amount of downhill forming is usually essential for light walled pipe sizes. However, the more commonly designed mill has been for the constant level bottom metal line which is suitable for the medium wall relative to pipe diameter where some amount of stress and strain can be tolerated in the process of metal forming. In FIGS. 16 and 17, there is illustrated what is known as a constant level bottom metal line. Here again, however, in order to form pipes of different size, the work contacting rollers 96 may be moved along an inclined linear path which intersects a horizontal projection of the bottom of all pipe sizes at the final pass. In FIG. 16, the smallest workpiece 240 may produce pipe of 6⅝ inches in diameter whereas the largest workpiece 241 may produce pipe of 16 inches in diameter. The roller 96 mounted on the shaft 201 may be moved along an inclined linear path 242 whereas the roller 96 mounted on shaft 188 may be moved along an inclined linear path 243. Such paths 242 and 243 intersect at 244. To achieve the intersecting paths of the upper and lower rollers, the respective shafts may be mounted on paths 245 and 246.

In FIG. 17, a schematic section may be taken closer to the final or No. 8 pass and it will be seen that the upper rollers 96 are mounted for movement along the inclined linear path 248 and that the lower rollers 96 are mounted for movement along the inclined linear path 249, such paths intersecting at 250 which is the horizontal projection of the bottom of the pipe at the squeeze rolls 32 and is longitudinally aligned with the point 244 in FIG. 16. To achieve such movement of the upper and lower rollers 96, the respective supporting shafts may be mounted for movement along the inclined linear paths 251 and 252 by means of the apparatus shown in FIGS. 9 through 12. In a constant bottom mill, the bottom or fifth roller 208 of the five roller assembly will be held in its proper vertical position and not inclined or adjusted as in a down-hill or up-hill mill. Again, as in FIG. 16, the pipe size may vary from the smaller pipe 6⅝ inches in diameter to the larger pipe 16 inches in diameter shown at 253 and 254, respectively.

Again viewing FIG. 16, 255 is the edge of metal of one pipe size and 256 is the edge of metal of a larger pipe in the same break down group. Edge 256 is a bit higher than edge 255 in relation to the adjacent work contacting roller. Similar comparison may be made between the edges 257 and 258, etc. for other break down groups. These unsupported portions of metal in each of large pipe mass contours is the result of the break down group requirement of the more conventional tooling. A close examination of such edges as seen both in FIGS. 16 and 17 indicates that the edges are not located consistently relative to the work contacting rollers. This is mostly due to the inconsistency of tooling design. It is, however, obvious that even without mathematical consistency in tooling design, the principle of the present invention can still be applied and the benefit of the invention can still be realized provided that the wall to O.D. ratio is not critical.

It can now be seen that the multiple roller assemblies 6, 10, 14 and 25 may be employed to replace a number of the heavier and more expensive contour roller pass stands which require to be replaced every time pipe size is changed. Moreover, it is believed evident that the multiple roller assemblies 6, 10, 14 and 25 may comprise the entire forming mill and the longitudinal movement of the workpiece may be obtained solely by means of the pull out stand 34. Such stand may comprise one or more units to obtain the desired pulling force to pull the workpiece through the mill to be shaped by the adjustable multiple roller assembly into the desired tube form.

(VI) *Constant slope angle development*

Referring now to FIG. 18, there is illustrated a development of the theory underlying one of the principles of the present invention. It has been discovered that at any given pass, in a consistent roll pass design, the edges of metal of all the tube sizes follow a straight line from tube size to tube size. In FIG. 18, line $a$–$b$ represents the initial flat metal or substantially pass No. 1 of a workpiece for large tube diameter, for example, $d2$. Line $c$–$d$ represents the same thing for a workpiece to form a small tube of finished diameter say $d1$. Line $a$–$b$ starts from an entry height of K times its finished diameter or $Kd2$, where K is a constant, from a common reference line 01–02 which may be the bottom of all finished tubes or the bottom of the tube at the squeeze rolls 32 in the final pass or welder unit 33. For a consistent roll pass design, line $c$–$d$ will start from its proportional entry height of $Kd1$. The equation:

$$\tan A = \frac{Kd2}{\frac{\pi}{2}d2} = \frac{Kd1}{\frac{\pi}{2}d1} = \frac{2K}{\pi} = \text{constant}$$

illustrates that the line joining the edges of metal $b$ and $d$ or $a$ and $c$ has a constant slope angle A. This constant slope angle A is also true for any other tube sizes so long as the same constant K is employed for this particular pass.

Similarly, the same is true for any other given pass in the forming mill line. The curve $e$–$f$ may represent metal contour of large finished tube of diameter, for example, $d2$ and curve $gh$ may represent the same for a small finished tube of diameter $d1$, at the same pass. Regardless of the type of curve used for this given pass, whether it be single radius, double radii or other combinations of contours, as long as the same design is consistently and proportionately used for various tube sizes, the edge will be positioned proportionately in relation to the vertical centerline and bottom of all finished tubes. The equation:

$$\tan B = \frac{md2 + p\frac{\pi}{2}d2}{n\frac{\pi}{2}d2} = \frac{md1 + p\frac{\pi}{2}d1}{n\frac{\pi}{2}d1} = \frac{m + p\frac{\pi}{2}}{n\frac{\pi}{2}} = \text{constant}$$

where $m$, $n$, and $p$, are constants, illustrates that the roller 96 which supports the edge of the curved metal contour for various tube sizes will follow a straight inclined path with constant slope angle B at any specific pass.

In FIG. 18, the curved contour of the metal strip, S or L, depending upon the tube size, has a curved contour of single radius. However, in FIG. 19, the curved contour of the workpiece has a double radii. The roller 96 at the edge of the metal follows a straight line $f$–$h$–$o$ or $e$–$g$–$o$ which have a constant slope angle C. Accordingly, it will be seen that as far as the roller contacting the edge of the metal is concerned, it is believed ascertained that the theory applies to pass contours of any type such as the single radius or double radii disclosed in FIGS. 18 and 19, respectively. It also makes no difference if down-hill, up-hill, or constant level bottom metal line is employed.

Another fact based upon the broad principle which is very useful in formulating the system of the present invention is that the line of constant slope does not have to be at the edge of metal contour, but is also applicable at any other point of the metal contour, at any given pass. In FIG. 19, point $ee$ of large diameter tube L' and the corresponding point $gg$ of the small diameter tube S' are on an inclined linear path or line $ee$–$gg$ which intersects the line 01–02 at O. Line 01–02 represents the bottom of all tube sizes or the bottom of the finished product at the squeeze rolls 32 of the final pass. Another point $pp$ of the larger diameter tube workpiece L' and the corresponding point $mm$ of the smaller diameter workpiece S' form a straight inclined line $pp$–$mm$ which intersects the line $ee$–$gg$ at the very same point O on the reference line 01–02. Accordingly, the lower rollers of the four roller assembly as in the unit 14 may be mounted on an inclined linear path in parallelism to the line $pp$–$mm$ to be shifted therealong to contact the corresponding point on tube workpieces of different size at any particular pass. Whereas there is illustrated two, four and five roll assemblies, it will be readily understood that any other number of rollers per pass can likewise be employed.

(VII) *Further modifications*

FIG. 20 illustrates a slightly modified two roll per pass assembly wherein the rollers 260 and 261 are carried on brackets 262 and 263 mounted on roller supporting shafts 264 and 265, respectively. Such shafts are supported by pillow block slides 266 and 267 mounted on slide tables 268 and 269, respectively. The slide tables are provided with adjusting screws 270 and 271 whereby the pillow blocks and the rollers supported thereby may be moved therealong from the full line position to the dotted line or lower position indicated at 272. The inner ends of the slide tables are mounted on pillow blocks 273 and 274 supported on shims 275 and 276 on stand 277. The outer ends of the slide tables are supported by means of pillow blocks 278 and 279 mounted on vertically extensible columns 280 and 281. Adjusting screws 282 and 283 extending from the column to the stand 277 may be employed vertically to adjust the height of the upper end of the slide tables 268 and 269, respectively. Such vertical adjustment of the outer end support for the slide tables 268 and 269 will, of course, facilitate the attainment of the proper predetermined inclined path of movement for the work contacting rollers 260 and 261. The adjustment screws 282 and 283 may be employed for initial set up only and the slide tables may then be locked in place. The stand 277 may be mounted on base 285 by similar adjusting screws 286 and 287 vertically to control the height of the work contacting rollers. It will now be seen that the stand shown in FIG. 20 can be employed as the stands 7, 8, 11 and 12 shown in FIG. 1 and the various adjustment features permit the slide tables thereon to be readily adjusted to the proper slope and vertical position for the respective passes.

Figure 21:
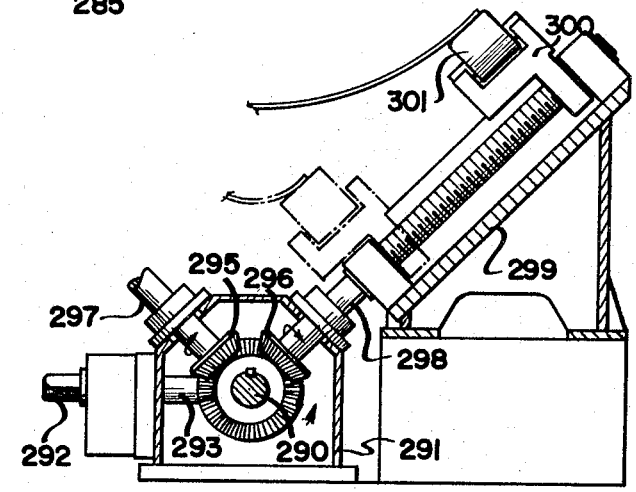
FIG. 21 is a fragmentary sectional view of the stand of the two roller type wherein each slide may be adjusted simultaneously.

FIG. 21 illustrates a further refinement wherein a longitudinally extending line shaft 290 may be mounted in housing 291. The shaft 290 may be turned by a suitable tool applied at 292 to turn shaft 293 which may be in bevel gear mesh with the shaft 290. Bevel gears 294 are also mounted on the control shaft 290 and in mesh with bevel gears 295 and 296 at each stand in the multiple roller assembly. Such bevel gears 295 and 296 turn screw shafts 297 and 298, respectively, extending through inclined slide tables 299 and move therealong supports 300 for work contacting rollers 301. Accordingly, the adjustment screws at each stand and on both sides of metal contour may be rotated through a single tool turning the longitudinally extending line shaft 290. Appropriate gear ratios may be provided for the sets of slide table adjusting screws in the particular multiple roller assembly so that the operator can adjust four or more screws at the same time by applying a turning movement at 292.

Figure 22:
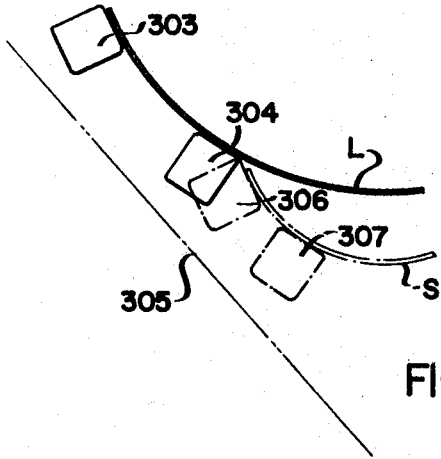
FIG. 22 is a schematic illustration of a further modification of the present invention.

FIG. 22 illustrates schematically a roller adjustment wherein two rollers 303 and 304 may be mounted for movement on a single inclined line of adjustment 305 and wherein the spacing between such rollers may be increased or decreased. The rollers 303 and 304 may be inclined toward each other or what may be termed cage rollers. To contact the larger workpiece L, the rollers will be substantially spaced and on the upper portion of the line of adjustment 305. For the smaller workpiece S, the roller 303 may be moved to the position 306 while the roller 304 is moved to the position 307. The angular relationship of the rollers may be maintained, but the spacing and position of such rollers along the line of adjustment 305 will be changed. Accordingly, two cage rollers may be mounted on a single line of adjustment on each side of the mill and conveniently moved therealong to form stock into tube of different finished diameters.

It can now to seen that there is provided a forming mill especially suitable for thin walled tube wherein a multitude of identical small rollers may be employed which are quite closely spaced in place of a few larger more conventional rolls. Accordingly, identical rollers may be used throughout the mill regardless of the location of the roller in the pass or the location of the pass in the assembly. Moreover, the same roller can be employed regardles of tube sizes and, of course, the same roller assembly can be employed regardless of tube sizes. With such smaller identical individual rollers, individual adjustment of the rollers is eliminated. Such rollers may accordingly be adjusted in groups to facilitate the changeover of the mill for different size finished tubes. The proper location and inclination of all the rollers in the assembly may be achieved by very simple adjustments for different tube sizes without the aid of pass templates, gauges, measurements, or other cumbersome and time consuming procedures. The cost of tooling and the time of change-over from one tube size to another is thereby greatly reduced. A tube forming mill is therefore provided which will handle a substantial range of tube sizes without change of assembly tooling and with a minimum amount of change-over time.

It can also be seen that there is provided a method of and apparatus for adjusting rollers in a tube mill to produce tubes of different sizes wherein the rollers are moved along a selected number of a pencil of lines through a point in a plane transversely of the mill with the vertex of the pencil at each pass being horizontally aligned. It will, however, be understood that the principles of the present invention can be utilized selecting lines in a plane transversely of the mill which may not precisely intersect or converge to a single point. For practical purposes and within ordinary tolerances, the roller assembly system of the present invention will work if the selected lines for a given pass intersect at two distinct points and the vertex of such lines at each pass is at a measurable but reasonable distance either up or down from the horizontal reference line.

Other modes of applying the principle of the invention may be employed, change being made as regards the details described, provided the features stated in any of the following claims or the equivalent of such be employed.

I, therefore, particularly point out and distinctly claim as my invention:

1. The method of adjusting work contacting rollers in a tube mill to accommodate tubes of different finished diameters at any given pass including the steps of mounting said work contacting rollers and of moving such rollers along inclined linear paths extending transversely of such mill each of which paths intersects substantially a horizontal reference line extending longitudinally of the mill.

2. The method of adjusting work contacting rollers in a tube mill to accommodate tubes of different finished diameters at any given pass including the steps of mounting said work contacting rollers and of moving such rollers along a selected number of inclined lines of a pencil of lines through a point in a plane transversely of such mill.

3. The method of claim 2 wherein the vertex of such pencil at each pass is horizontally aligned.

4. The method of claim 2 wherein the selected lines of such pencil are symmetrical with respect to the vertical plane passing through the center of the mill.

5. The method of claim 2 including the step of increasing the inclination of such selected number of lines of such pencil at each succeeding pass.

6. The method of claim 2 wherein one line on each side of a vertical plane passing through the center of the mill is selected.

7. The method of claim 2 wherein two lines on each side of a vertical plane passing through the center of the mill are selected.

8. The method of forming different size tubes in a mill comprising the steps of mounting two work contacting rollers on angularly related intersecting inclined paths at a given mill pass, and moving such rollers toward and away from each other on their respective paths to form tubes of smaller and larger finished diameters, respectively.

9. The method of claim 8 wherein such paths at each pass intersect at a substantially common reference line extending longitudinally of the mill.

10. The method of claim 9 wherein the inclination of such paths is increased at each succeeding pass.

11. The method of forming different size tubes in a mill comprising the steps of mounting four work contacting rollers on angularly related intersecting inclined linear paths at a given pass, and moving such rollers toward and away from each other on their respective paths to form tubes of smaller and larger finished diameters, respectively.

12. The method of claim 11 wherein the paths of such rollers at each pass intersect at a substantially common reference line extending longitudinally of such mill.

13. The method of claim 12 wherein the inclination of such paths increases at each succeeding pass.

14. A roll stand for a tube mill and the like comprising two work contacting rollers, means mounting said rollers on angularly related intersecting inclined linear paths, and means operative to move said rollers along said paths to form different size tubes in such mill.

15. A roll stand as set forth in claim 14 wherein said inclined paths are symmetrical with respect to the vertical plane passing through the center of the mill.

16. A roll stand as set forth in claim 14 wherein said inclined paths are symmetrical with respect to a vertical plane passing through their point of intersection.

17. A roll unit for a tube mill line comprising a stand adapted to be positioned transversely of such line, oppositely inclined slide tables on each side of said stand, roller supports on each slide table mounted for movement therealong, and work contacting rollers mounted on said roller supports.

18. A roll unit as set forth in claim 17 wherein the paths of movement afforded said rollers where they contact such work by said slide tables intersect at the center of such mill at a point horizontally aligned with the bottom of the finished tube regardless of tube size.

19. A roll unit as set forth in claim 17 including means to vary the angle of inclination of said slide tables.

20. A roll unit as set forth in claim 17 wherein the angle of inclination of said slide tables will vary depending upon the pass location of said unit in the mill.

21. A roll unit as set forth in claim 17 wherein said roller supports each include longitudinally extending roller support members, and a plurality of longitudinally spaced work contacting rollers mounted on said members.

22. A roll unit as set forth in claim 17 including oppositely inclined columns mounted on said stand, roller supports on each column, means operative to extend and retract said columns, and work contacting rollers mounted on said roller supports carried by said column.

23. A roll unit as set forth in claim 17 wherein the outer ends of said slide tables are mounted on jack means operative to vary the angle of inclination thereof.

24. A roll unit as set forth in claim 17 including means operative simultaneously to move said roller supports along said slide tables toward and away from each other.

25. A roll unit for a tube mill line comprising a first stand adapted to be positioned transversely of such line, oppositely inclined slideways on each side of said stand, a second stand aligned with and spaced from said first stand, oppositely inclined slideways on each side of said second stand, roller supports extending between and mounted on the corresponding slideways of said first and second stands, and work contacting rollers mounted on said roller supports.

26. A roll unit as set forth in claim 25 including slides mounted on said slideways of said first and second stands, said roller supports being mounted on said slides on the corresponding slideways.

27. A roll unit as set forth in claim 26 wherein said slides comprise pillow blocks, and said roller supports comprise elongated members, said members being mounted in said pillow blocks by means of spherical self-aligning bearings.

28. A roll unit as set forth in claim 26 including oppositely inclined columns mounted on said first and second stands, roller supports mounted on the corresponding columns of said first and second stands, means operative to extend and retract said columns, and work contacting rollers mounted on said roller supports carried by said columns.

29. A roll unit as set forth in claim 28 wherein the paths of movement afforded said work contacting rollers by said columns and slideways transversely of such mill line intersect a horizontal line extending longitudinally of the mill.

30. A tube mill comprising an elongated member extending longitudinally of the mill, a plurality of work contacting rollers mounted on said member, means operative to mount said shaft in a predetermined angular position, and means operative bodily to shift the position of said member to another predetermined angular position.

31. A tube mill as set forth in claim 30 including at least two supports for said member, means operative to shift said supports along respective inclined paths having different angles of inclination, and a plurality of work contacting rollers mounted on said member.

32. A tube mill as set forth in claim 31 including spherical self-aligning bearings mounting said member in said supports.

33. A tube mill as set forth in claim 32 wherein said supports are mounted on inclined slide tables, means operative to shift said supports along said inclined slide tables, and hold said supports in a predetermined position.

34. A tube mill as set forth in claim 32 wherein said supports are mounted on inclined columns, means operative to extend and retract said columns, and hold said columns in predetermined positions.

35. A tube mill as set forth in claim 34 including means to rigidify said columns when extended.

36. A tube mill as set forth in claim 32 including means operative simultaneously to adjust the positions of said supports along their respective inclined paths.

37. A tube mill as set forth in claim 30 including a plurality of elongated members having work contacting rollers thereon, said members constituting substantial longitudinal continuations of each other.

38. A tube mill comprising a plurality of multiple roller assemblies, each assembly including a plurality of elongated roller supports extending longitudinally of the mill, a plurality of work contacting rollers mounted on said roller supports, the rollers on each support all contacting substantially the same longitudinal portion of the work moving through the assemblies, and means operative substantially to align said roller supports on successive assemblies.

39. A tube mill as set forth in claim 38 including means operative to adjust the positions of said roller supports while maintaining such substantial alignment to form tubes of different finished diameters.

References Cited

UNITED STATES PATENTS

| | | | |
|---|---|---|---|
| 1,878,595 | 9/1932 | Moller | 80—31.1 |
| 2,764,214 | 9/1956 | Reynolds et al. | 72—176 |
| 3,159,199 | 12/1964 | Ruple | 72—178 |
| 3,258,950 | 7/1966 | Durr | 72—176 |

CHARLES W. LANHAM, *Primary Examiner.*

C. H. HITTSON, A. RUDERMAN, *Assistant Examiners.*